United States Patent

[11] 3,607,908

[72] Inventors Kichiji Enoki;
 Tokio Sumitani; Yoichi Yoshihara, all of Takaoka-shi, Japan
[21] Appl. No. 768,912
[22] Filed Oct. 18, 1968
[45] Patented Sept. 21, 1971
[73] Assignee Nippon Soda Kabushiki Kaisha
 Tokyo-to, Japan
[32] Priority Oct. 23, 1967
[33] Japan
[31] 42/67863

[54] PROCESS FOR PURIFYING BIS (β-HDROXYETHYL) TEREPHTHALATE
 9 Claims, No Drawings
[52] U.S. Cl. ................................................ 260/475 PR
[51] Int. Cl. ........................................................ C07c 69/82
[50] Field of Search .......................................... 260/475 PR

[56] References Cited
UNITED STATES PATENTS
3,435,067 3/1969 Kitabatake et al. ............ 260/475

Primary Examiner—Lewis Gotts
Assistant Examiner—E. Jane Skelly
Attorney—Nolte and Nolte ABSTRACT: Process for purifying crude bis (β-hydroxyethyl) terephthalate produced from crude terephthalic acid which comprises contacting a solution of crude bis (β-hydroxyethyl) terephthalate with light metal such as zinc, tin or magnesium, which is preferably used in the shape having a large surface area per unit volume, in the presence or absence of a water soluble organic or inorganic acid salt of said light metal.

PROCESS FOR PURIFYING BIS (β-HDROXYETHYL) TEREPHTHALATE

THE DETAILED EXPLANATION OF THE INVENTION

The present invention relates to a process for purifying crude bis(β-hydroxyethyl)terephthalate and more particularly is concerned with a process for purifying crude bis (β-hydroxyethyl)terephthalate produced from crude terephthalic acid.

Bis(β-hydroxyethyl)terephalate (hereafter referred to as BHET) is mainly used in the production of polyethylene terephthalate, an important polyester in the manufacture of fiber and films. When terephthalic acid, which is one of raw materials of BHET, is prepared by the oxidation of a p-dialkyl benzene, the product contains such impurities as aldehydes. Further, when terephthalic acid containing such impurities is used to prepare BHET, the same impurities are carried along into the diester product and have a deleterious effect on the polymer prepared therefrom. To be acceptable for many uses, polyethylene terephthalate must be white. However, the presence of traces of impurities in the BHET from which the polyester is prepared causes undesirable coloring in or a low degree of polycondensation of the polymer. Thus, there is a great need for an effective process for purifying BHET.

In order to purify crude BHET, recrystallization processes using water or organic solvents are usually employed. The recrystallization however does not give satisfactory result. When water is utilized, the recrystallization has to be repeated several times and consequently, the yield on purification is seriously decreased. Further, the apparatus required has to be enlarged and made more complicated, so that this process has not proved suitable for commercial production. Methanol, ethanol, acetone, and methylethyl ketone and the like are comparatively favorable solvents for use in the recrystallization of crude BHET, and it is possible to reduce the repetition of the recrystallizations as compared with water. However, it is considerably difficult to apply this process commercially, because the solvents involved have a high solubility for BHET, so that the yield on purification is lower even than when water is used.

It is an object of this invention to provide an economical method for the purification of crude BHET simple in operation and producing good yield.

It is another object of the invention to provide BHET which can be polycondensed to form a high molecular weight polymer having little or no color.

We have found that impurities are easily removed from crude BHET by contacting the solution of crude BHET with a light metal such as zinc, tin or magnesium at an elevated temperature and thereafter cooling the solution in order to crystallize BHET. Further, by adding a salt of such metals to the solution together with the light metal, purification is performed more effectively.

Thus, the practice of this invention is carried out as follows:

Water and a light metal such as zinc, tin, magnesium or a mixture thereof are added to the crude BHET produced from crude terephthalic acid with or without a water soluble organic or inorganic acid salt of the metal and the resultant mixture. After agitating for more than 10 minutes, preferably 20 to 50 minutes, under heating to a temperature of more than 40° C. the mixture is cooled and the crystallized BHET is separated therefrom.

BHET may be recrystallized from aqueous solution if desired. In this case, the quantity of water used for recrystallization is three to five times as much as the BHET by weight and the recrystallizing operation takes place by cooling the BHET solution below 30° C. after heating past 70° C.

Further, the purifying and recrystallizing operation may be practiced together with an active carbon treatment and thereby, the purification may be further enhanced. Generally, 0.1 to 3 weight percent preferably 0.5 to 1 weight percent of active carbon based on the BHET is employed.

The light metal used in accordance with the invention is selected from the group consisting of zinc, tin and magnesium. Although the optimum range for the amount of the light metal varies depending upon the purity of crude BHET or a kind of light metal, the said amount in generally selected in the range of 0.01 to 5 weight percent based on BHET. An advantageous shape for the light metal is one having a large surface area per unit volume such as metal powder, dust, chips leaf, foil and granules. As the salt of the light metal used with the light metal, all water soluble salts of inorganic or organic acids can be used and preferably there are used compounds such as zinc chloride, zinc sulfate, zinc nitrate, zinc acetate, stannous chloride, stannic chloride, stannic sulfate, stannic acetate, magnesium chloride and magnesium sulfate.

The quantity of water used for dissolving the crude BHET is one to 10 times, and preferably two to five times by weight the BHET. The water may contain other solvents such as alcohols. The optimum range of temperature for treating the BHET solution with the light metal is 50 to 150° C, and preferably 60 to 100° C. When the said temperature is in the neighborhood of or above boiling point of the solvent, an appropriate autoclave is used and the operation is additionally carried out under pressure.

In order to completing the purification, it is necessary to agitate at the above temperature for more than 10 minutes, preferably 20 to 60 minutes.

After the above treatment, the solution is cooled, the deposited crystalline BHET is separated from the remaining solution and dried. The purified BHET is obtained in good yield by the process of this invention. It substantially does not contain color-producing impurities and therefor is suitable as a raw material of fiber or film.

The following examples illustrate specific embodiments of the process of the present invention.

EXAMPLE 1

1 kg. of crude terephthalic acid, 600 g. of ethylene oxide, and 7 g. of tetraethylammonium chloride were charged into a stainless steel autoclave provided with an agitator and the atmosphere in the autoclave replaced by nitrogen gas. The mixture was heated under agitation and the reaction was carried out at 100° C. for 70 minutes. After the reaction was finished, the reaction mixture was removed from the autoclave and about 3 kg. of water was added to it. The resulting mixture was heated to 65° C. and was filtered under warming. The filtrate was cooled to 5° C. and the crystals of crude BHET (A) having a light yellowish brown color formed separated by filtration from the mixture. Yield amount: 1.4 kg. Melting point: 109 to 110° C.

100 g. above crude BHET (A), 300 cc. of water and 0.2 g. of zinc powder were mixed and this mixture was heated at 90° C. with agitation for 30 minutes. Then, the resulting solution was filtered at that temperature and the nonreacted zinc powder removed therefrom. The filtrate was cooled to 25° C. The deposited crystals were separated from the mixture and rinsed with cold water, 91 g. of purified BHET (B) were obtained.

20 g. above purified BHET (B) and 3 mg. of antimony trioxide were charged into a polymerization tubular reactor and the resulting mixture was heated under a normal pressure and maintained for 30 minutes at 275 ° C. Then, its pressure was gradually reduced to 1 mm. hg. or less and the reduced pressure maintained for two hours at 275° C. Thus, polyethylene terephthalate having a transparent, slightly yellowish color in the melt time was obtained. The polyester showed a coloring degree, [C]: 8.7, inherent viscosity, I.V.:0.63 and a melting point: 263° C.

In the above experiments, the inherent viscosity, I.V., was determined at 25° C. at a concentration of 0.5 g. per 100 ml. in a 50/50 mixture of phenol/tetrachloroethane. The I.V. was calculated from the relationship I.V.=$(1n\eta[C])$ where $\eta$rel is the ratio of flow time for solution to that for pure solvent in capillary viscometer, and [C] is the concentration (0.5).

The coloring degree, [C], is the average of three [C] values calculated by insertion of the three times repeated measurement values into the following equation:

$$(C) = \frac{B \times 100}{B+Y+R} - 33.3 + \frac{Y+100}{B+Y+R}$$

$$-33.3 + \frac{R \times 100}{B+Y+R} - 33.3$$

wherein each of [C], Y and R is a reflection ratio for each of the wave lengths 440 M$\mu$, 540 m$\mu$ and 640 M$\mu$, and [C] is a total of absolute deviations of reflection ratios in each wave length.

The reflection ratios were determined as follows:
A reflection light strength of a white filter paper (No. 2 TOYO PAPER CO., LTD.) which was applied onto the bottom of 28 mm. diameter plate was measured by the SHIMAZU QB-50 type spectrophotometer fitted with a reflector, and then the reflecting light strength of sample polyester chips having a 1–2 mm. diameter and a length of 5–10 mm. length evenly arranged on the same filter paper and the plate measured according to the same procedure. Ratios of the second to the first, reflection ratios in each wave length of 440 m$\mu$, 540 m$\mu$ and 640 m$\mu$ were determined.

EXAMPLE 2

150 cc. of distilled water and 0.5 g. of active carbon were added to 50 g. of the purified BHET (B) of Example 1 and the resulting mixture was agitated at 80° C. for 30 minutes.

THe mixture was filtered at that temperature and the filtrate was cooled to 25°C. The crystals deposited were separated from mixture by filtration and dried. 47.2 g. of purified BHET (C) were obtained. Melting point: 110.5 to 111.5° C. Additionally the mother liquor was concentrated and thereby 2.2 g. of BHET was recovered.

The above BHET was polycondensed under the same conditions as shown in Example 1, and transparent polyethylene terephthalate, having a slight yellowish color when it was melted was obtained. Coloring degree [C] of this polyester: 6.5. I.V.: 0.65. Melting point: 264° C.

EXAMPLE 3

As a comparable example, the crude BHET (A) was polycondensed under the same conditions as shown in Example 1 and a polyester having a yellowish brown color and a coloring degree [C] of 20.5 was obtained.

300 cc. water were added to 100 g. of the crude BHET (A) and the resulting mixture was heated to 80° C. Then, this solution was cooled at 25 ° C. and the deposited crystals separated by filtration and dried. BHET (D) was thereby obtained. The said BHET (D) was polycondensed under the same conditions as in Example 1 and a polyester having a coloring degree [C] of 19.2 was obtained. A further 40 g. of BHET (D) was dissolved in 120 g. of water and 0.4 g. of active carbon introduced into the solution. The resulting mixture was heated at 80° C. and simultaneously agitated for 30 minutes. Then, the mixture was filtered at that temperature and the filtrate was cooled to 25° C. The crystals formed were separated by filtration and dried, BHET (E) was obtained. The BHET (E) was polycondensed under the same condition as shown in Example 1 and a polyester having a coloring degree [C] of 17.3 was obtained.

EXAMPLE 4

100 g. of the crude BHET (A) of Example 1, 300 cc. of water, 0.2 g. of zinc powder and 00.4 g. of zinc chloride were mixed and the mixture was heated at 90° C. with agitation for 30 minutes. Then the mixture was filtered at that temperature and any insoluble product was removed therefrom. A filtrate was cooled to 25° C. and the crystals of BHET (F) formed separated by filtration and rinsed with cold water.

The BHET (F) was polycondensed by the same process as described in Example 1 and the transparent polyester having a slightly yellowish color and a coloring degree [C] of 8.4 was obtained.

EXAMPLE 5

150 cc. of distilled water and 0.5 g. of active carbon were added to 50 g. of BHET (F) and the mixture was heated at 90° C. accompanied with EXAMPLE 530 minutes. Then, the said mixture was filtered at that temperature and the filtrate was cooled to 25° C.

The crystals formed were separated by filtration and dried. 47.4 g. of purified BHET (G) were obtained. The BHET (G) had a melting point in the range of 110.5 to 111.5° C. This compound was polycondensed by the same process as described in Example 1 and a polyester having a coloring degree [C] of 6.1 was obtained.

EXAMPLE 6

100 g. of crude BHET (A), 300 cc. of water and 0.2 g. of tin powder were mixed and the mixture was heated at 90° C. accompanied with agitation for 30 minutes. Then, this mixture was filtered at that temperature and any insoluble compounds removed therefrom and the filtrate was cooled to 25° C.

The crystals were separated from the mixture by filtration and dried and thereby 95.6 g. of purified BHET (H) obtained. The BHET (H) had a melting point in the range of 110.2 to 111° C. The mother liquor was concentrated and a further 3.6 g. of BHET recovered.

BHET (H) was polycondensed by the same process as shown in Example 1. A transparent polyester having slightly yellowish color and a coloring degree [C] of 9.4 was obtained.

EXAMPLE 7

BHET (H) was treated together with 10 weight percent of active carbon by the same process described in Example 5 to obtain purified BHET (I), and the said purified BHET (I) was polycondensed by means of the process shown in Example 1. A polyester having a coloring degree [C] of 7.5 was obtained.

EXAMPLE 8

100 g. of crude BHET (A), 300 cc. of water and 1 g. of small chips of magnesium were mixed and heated at 90° C. under agitation for 50 minutes. Thereafter, 2 g. of active carbon were added to the mixture and the agitation further continued for 30 minutes. The unreacted magnesium and active carbon were filtered off and the filtrate was cooled to 25° C. The crystals of BHET (J) were separated off by filtration and rinsed with cold water. BHET (J) was polycondensed by the same process described in Example 1. A polyester having a coloring degree [C] of 8.2 was obtained.

What is claimed is:

1. The process for purifying crude bis-($\beta$-hydroxyethyl)-terephthalate by removing impurities derived from the terephthalic acid starting material and which were originally produced in the oxidation of alkyl benzene to form said terephthalic acid which comprises contacting a solution of bis-($\beta$-hydroxyethyl)-terephthalate at a temperature of from 40° C. to 150° C. with at least about 0.01 percent based on the weight of bis-($\beta$-hydroxyethyl)-terephthalate, of a light metal selected from the group consisting of zinc, tin and magnesium.

2. The process of claim 1 wherein said light metal is used in powder, dust, chip, foil, leaf or granule form.

3. The process according to claim 1 wherein said solution of bis-($\beta$-hydroxyethyl)-terephthalate is additionally contacted with at least 0.1 percent based on the weight of bis-($\beta$-hydroxyethyl)-terephthalate of active carbon.

4. The process according to claim 1 wherein said light metal is zinc.

5. The process according to claim 1 wherein said bis-($\beta$-hydroxyethyl)-terephthalate is bis-($\beta$-hydroxyethyl)-terephthalate from an aqueous solution following said contacting with said light metal.

6. The process according to claim 1 wherein said solution of bis-($\beta$-hydroxyethyl)-terephthalate is contacted with said light metal in the presence of a metal salt selected from the group consisting of the chlorides, sulfates, nitrates and acetates of said light metal.

7. The process according to claim 6 wherein said light metal is zinc and said metal salt is zinc chloride.

8. The process according to claim 1 wherein said light metal is tin.

9. Process according to claim 1 wherein said light metal is magnesium.

UNITED STATES PATENT OFFICE
CERTIFICATE OF CORRECTION

Patent No. 3,607,908  Dated Sept. 21, 1971

Inventor(s) ENOKI ET AL

It is certified that error appears in the above-identified patent and that said Letters Patent are hereby corrected as shown below:

Claim 5, Column 4, line 71, after "is" insert -- recrystallized -- and cancel " bis-($\beta$- hydroxyethyl)-terephthalate"

Signed and sealed this 7th day of March 1972.

(SEAL)
Attest:

EDWARD M. FLETCHER, JR.            ROBERT GOTTSCHALK
Attesting Officer                  Commissioner of Patents